US011959596B2

(12) United States Patent
Shao et al.

(10) Patent No.: US 11,959,596 B2
(45) Date of Patent: Apr. 16, 2024

(54) METHODS FOR PIPELINE NETWORK INSPECTION ZONE GENERATION BASED ON SMART GAS AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/301,251

(22) Filed: Apr. 16, 2023

(65) Prior Publication Data

US 2023/0250924 A1 Aug. 10, 2023

(30) Foreign Application Priority Data

Feb. 13, 2023 (CN) ......................... 202310104342.7

(51) Int. Cl.
*F17D 5/00* (2006.01)
*G16Y 20/00* (2020.01)
(Continued)

(52) U.S. Cl.
CPC .............. *F17D 5/005* (2013.01); *G16Y 20/00* (2020.01); *G16Y 40/10* (2020.01); *G16Y 40/50* (2020.01)

(58) Field of Classification Search
None
See application file for complete search history.

(56) References Cited

U.S. PATENT DOCUMENTS

2023/0191464 A1* 6/2023 Shao ....................... B08B 13/00
15/104.061

FOREIGN PATENT DOCUMENTS

CN 105225069 A 1/2016
CN 109767513 A 5/2019
(Continued)

OTHER PUBLICATIONS

CN 115388342 A, IDS record, translation (Year: 2022).*
(Continued)

*Primary Examiner* — Lina Cordero
(74) *Attorney, Agent, or Firm* — METIS IP LLC

(57) ABSTRACT

The embodiment of the present disclosure provides a method for pipeline network inspection zone generation based on smart gas and an Internet of Things system thereof. The method is implemented based on the Internet of Things system. The Internet of Things system includes a smart gas pipeline network safety management platform, a smart gas sensor network platform, and a smart gas object platform which interact in turn. The method includes: obtaining area feature information of a target inspection area of a gas network based on the smart gas object platform through the smart gas sensor network platform; generating one or more key inspection points in the target inspection area based on the area feature information of the target inspection area; and generating one or more inspection zones in the target inspection area based on the one or more key inspection points.

9 Claims, 6 Drawing Sheets

200

(51) Int. Cl.
*G16Y 40/10* (2020.01)
*G16Y 40/50* (2020.01)

(56) References Cited

FOREIGN PATENT DOCUMENTS

| | | | |
|---|---|---|---|
| CN | 110388568 | A | 10/2019 |
| CN | 115388342 | A | 11/2022 |
| CN | 115496625 | A | 12/2022 |
| CN | 115545231 | A | 12/2022 |
| CN | 115587640 | A | 1/2023 |
| CN | 115623440 | A | 1/2023 |
| GB | 201517038 | | 3/2021 |
| WO | 2011137460 | A2 | 11/2011 |
| WO | 2020237668 | A1 | 12/2020 |

OTHER PUBLICATIONS

Qin, Gang, Regional Metering Zoning (DMA) Technology Research and Practice in Safe City Gas Operation, City Gas, 2022, 8 pages.
Yang, Ting et al., Design and Implementation of a GIS-based Intelligent Inspection Platform, Geospatial Information, 2018, 4 pages.
Gu, Xunao, Risk Analysis of Urban Gas Pipeline and Optimization of Inspection Strategy, Chinese Master's Theses Full-text Database, 2022, 83 pages.
Zhang, Qian, Investigation and Analysis of Hidden Troubles of High Pressure Pipeline Occupancy in Town Gas Based on Remote Sensing Images, Chinese Master's Theses Full-text Database, 2020, 84 pages.
Liu, Xuan, Technical Management on Production and Operation of City Gas Intelligent Pipe Network, Chinese Master's Theses Full-text Database, 2018, 85 pages.
Lin, Fan et al., A Systematic Method for the Optimization of Gas Supply Reliability in Natural Gas Pipeline Network Based on Bayesian Networks and Deep Reinforcement Learning, Reliability Engineering and System Safely, 225: 1-15, 2022.
Wang, Liang et al., Research on Quantitative Evaluation Method of Gas User Regional Safety, 2nd International Conference on Applied Mathematics, Modeling, and Intelligent Computing(CAMMIC 2022), 12259: 122594F-1-122594F-6, 2022.
Notification to Grant Patent Right for Invention in Chinese Application No. 202310104342.7 dated Apr. 22, 2023, 6 pages.
First Office Action in Chinese Application No. 202310104342.7 dated Apr. 6, 2023, 21 pages.

* cited by examiner

METHODS FOR PIPELINE NETWORK INSPECTION ZONE GENERATION BASED ON SMART GAS AND INTERNET OF THINGS SYSTEMS THEREOF

CROSS-REFERENCE TO RELATED APPLICATIONS

This application claims priority to Chinese Patent Application No. 202310104342.7, filed on Feb. 13, 2023, the entire contents of which are incorporated herein by reference.

TECHNICAL FIELD

The present disclosure relates to the field of gas pipeline network inspection, and in particular, to a method for pipeline network inspection zone generation based on smart gas and an Internet of Things system.

BACKGROUND

Gas is flammable and explosive, so the safety of the gas during a transportation process is extremely important, which puts forward a high requirement for the reliability of gas transportation pipelines. In order to ensure the safety of gas transportation, regular maintenance of gas pipelines is required. The distribution of a gas pipeline network is intricate, and if an inspection zone allocation of inspection personnel is not clear and reasonable, it will not only consume a lot of manpower, material resources, and time, but also easily lead to missed inspections, and some pipeline faults may not be found and dealt with at the first time.

Therefore, it is hoped to propose a method for pipeline network inspection zone generation based on smart gas and an Internet of Things system, which can reasonably allocate the inspection zone of each inspection personnel, clarify a scope of duties of the inspection personnel, and improve efficiency of gas pipeline network inspection.

SUMMARY

One or more embodiments of the present disclosure provide a method for pipeline network inspection zone generation based on smart gas. The method is implemented based on an Internet of Things system for pipeline network inspection zone generation based on smart gas, wherein the Internet of Things system includes a smart gas pipeline network safety management platform, a smart gas sensor network platform, and a smart gas object platform that interact in turn. The method is executed by a processor in the smart gas pipeline network safety management platform, including: obtaining area feature information of a target inspection area of a gas network based on the smart gas object platform through the smart gas sensor network platform; generating one or more key inspection points in the target inspection area based on the area feature information of the target inspection area; and generating one or more inspection zones in the target inspection area based on the one or more key inspection points.

One or more embodiments of the present disclosure provide an Internet of Things system for pipeline network inspection zone generation based on smart gas, including a smart gas pipeline network safety management platform, a smart gas sensor network platform, and a smart gas object platform that interact in turn. The smart gas pipeline network safety management platform configured to: obtain area feature information of a target inspection area of a gas network based on the smart gas object platform through the smart gas sensor network platform; generate one or more key inspection points in the target inspection area based on the area feature information of the target inspection area; and generate one or more inspection zones in the target inspection area based on the one or more key inspection points.

One or more embodiments of the present disclosure provide a non-transitory computer-readable storage medium, wherein the storage medium stores computer instructions. When the computer instructions are executed by a processor, the above-mentioned method for the pipeline network inspection zone generation based on smart gas.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
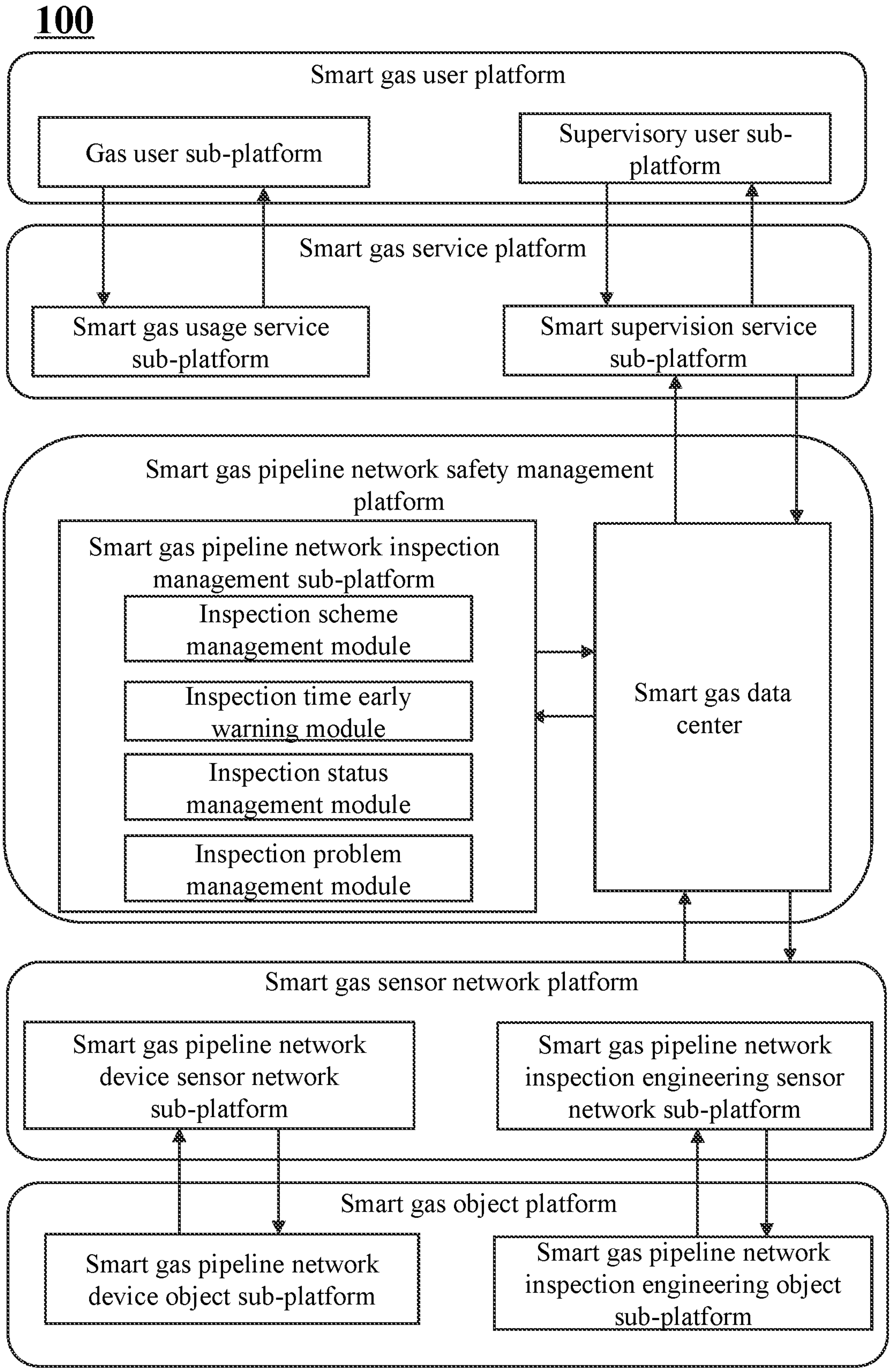
FIG. 1 is a schematic diagram illustrating an application scenario of an Internet of Things system for pipeline network inspection zone generation based on smart gas according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "an", "one", and/or "the" is not specifically singular form, and the plural form may be included. It will be further understood that the terms "comprise," "comprises," "comprising," "include," "includes," and/or "including," when used in the present disclosure, specify the presence of stated steps and elements, but do not preclude the presence or addition of one or more other steps and elements thereof.

The flowcharts are used in the present disclosure to illustrate the operations performed by the system according to the embodiment of the present disclosure. It should be understood that the front or rear operation is not necessary performed in order. Instead, the operations may be processed in reverse order or simultaneously. Moreover, one or more other operations may be added to the flowcharts. One or more operations may be removed from the flowcharts.

FIG. 1 is a schematic diagram illustrating an application scenario of an Internet of Things system 100 for pipeline network inspection zone generation based on smart gas according to some embodiments of the present disclosure. In some embodiments, the Internet of Things system 100 for pipeline network inspection zone generation based on smart gas may include a smart gas user platform, a smart gas service platform, a smart gas pipeline network safety management platform, a smart gas sensor network platform, and a smart gas object platform.

In some embodiments, the processing of information in the Internet of Things may be divided into a processing process of perception information and a processing process of control information, and the control information may be information generated based on the perception information. The processing of the perception information is that the perception information is perceived by the smart gas object platform, and finally sent to the smart gas user platform for a user to obtain through the smart gas sensor network platform, the smart gas pipeline network safety management platform, and the smart gas service platform. The control information is generated by the user through the smart gas user platform, and finally sent to the smart gas object platform to control the smart gas object platform to complete a corresponding control instruction through the smart gas service platform, the smart gas pipeline network safety management platform, and the smart gas sensor network platform.

The smart gas user platform may be a platform for interaction with the user. In some embodiments, the smart gas user platform may be configured as a terminal device, for example, the terminal device may include a mobile device, a tablet computer, or the like, or any combination thereof. In some embodiments, the smart gas user platform may be used to feed information in gas pipeline network inspection management information that may affect a gas usage of the user back to the user. For example, the gas pipeline network inspection management information may include information about an abnormal operation of a pipeline network device (such as a pipeline). The information about the abnormal operation of the pipeline network device may cause an inspection zone to be overhauled, which in turn may cause users in the inspection zone to stop the gas usage. In some embodiments, the gas pipeline network inspection management information may include inspection zones that each inspection personnel is responsible for. In some embodiments, the smart gas user platform is provided with a gas user sub-platform and a supervisory user sub-platform. The gas user sub-platform is oriented to gas users, and the gas users refer to users who use gas. The supervisory user sub-platform is oriented to supervisory users, and supervises an operation of the entire Internet of Things system 100 for pipeline network inspection zone generation based on smart gas. The supervisory users refer to users of a safety department. In some embodiments, the smart gas user platform may downwardly interact with the smart gas service platform in a two-way manner. The smart gas user platform may receive the gas pipeline network inspection management information uploaded by the smart gas service platform and issue gas pipeline network inspection management related information query instructions to the smart gas data center, etc.

The smart gas service platform may be a platform for receiving and transmitting data and/or information. For example, the smart gas service platform may send the information in the gas pipeline network inspection management information that may affect the gas usage of the user to the smart gas user platform. In some embodiments, the smart gas service platform is provided with a smart gas usage service sub-platform and a smart supervision service sub-platform. The smart gas usage service sub-platform corresponds to the gas user sub-platform, providing the gas users with safety gas services. The smart supervision service sub-platform corresponds to the supervisory user sub-platform, providing safety supervision services for the supervisory users. In some embodiments, the smart gas service platform may perform two-way interaction with the smart gas pipeline network safety management platform. The smart gas service platform may receive the gas pipeline network inspection management information uploaded by a smart gas data center and issue the gas pipeline network inspection management related information query instructions to the smart gas data center of the smart gas pipeline network safety management platform.

The smart gas pipeline network safety management platform refers to a platform that coordinates the connection and collaboration between various functional platforms, gathers all information of the Internet of Things, and provides perception management and control management functions for an operation system of the Internet of Things. For example, the smart gas pipeline network safety management platform may obtain a target inspection area and area feature information thereof. For a specific content of the area feature information, please refer to FIG. 2 and its related descriptions below.

In some embodiments, the smart gas pipeline network safety management platform is provided with the smart gas data center and a smart gas pipeline network inspection management sub-platform. The smart gas data center and the smart gas pipeline network inspection management sub-platform interact in both directions. The smart gas pipeline network inspection management sub-platform obtains at least one target inspection area and its feature information from the smart gas data center, and feeds corresponding remote control instructions back. The smart gas pipeline network safety management platform performs information interactions with the smart gas service platform and the smart gas sensor network platform through the smart gas data center. In some embodiments, the smart gas data center may issue an instruction of obtaining relevant data of gas pipeline network inspection management to the smart gas sensor network platform. In some embodiments, the smart gas data center may receive the area feature information uploaded by the smart gas sensor network platform downward, and send it to the smart gas pipeline network inspection management sub-platform for processing, and then send summarized and processed data to the smart gas service platform and/or the smart gas sensor network platform through the smart gas data center. In some embodiments, the smart gas pipeline network inspection management sub-platform of the smart gas pipeline network safety management platform is provided with an inspection scheme management module, an inspection time early warning module, an inspection status management module, and an inspection problem management module.

The smart gas sensor network platform may be a functional platform for managing sensor communication. The smart gas sensor network platform may be configured as a communication network and gateway to realize functions such as network management, protocol management, instruction management, and data analysis. In some embodiments, the smart gas sensor network platform may be connected to the smart gas pipeline network safety management platform and the smart gas object platform to realize the functions of sensor communication of the perception information and sensor communication of the control information. In some embodiments, the smart gas sensor network platform may include a smart gas pipeline network device sensor network sub-platform and a smart gas pipeline network inspection engineering sensor network sub-platform. The smart gas pipeline network device sensor network sub-platform may correspond to the smart gas pipeline network device object sub-platform, and is used to obtain the relevant data of the pipeline network device. The smart gas pipeline network inspection engineering sensor network sub-platform corresponds to the smart gas pipeline network inspection engineering object sub-platform, and may be used to issue inspection reminder instructions to the smart gas pipeline network inspection engineering object sub-platform. In some embodiments, the smart gas sensor network platform may receive the remote control instructions issued by the smart gas data center, send the remote control instructions to the smart gas object platform, and upload the relevant data of the gas pipeline network inspection management to the smart gas data center. The data related to the gas pipeline network inspection management may include abnormal operation information of a pipeline network device (such as a pipeline), inspection problems, accident information, inspection execution situations, etc. In some embodiments, the smart gas sensor network platform may receive the relevant data of the gas pipeline network inspection management uploaded by the smart gas object platform, and issue an instruction of obtaining the relevant data of the gas pipeline network inspection management to the smart gas object platform.

The smart gas object platform may be a functional platform for generating the perception information and executing the control information. The smart gas object platform may be configured as various types of devices. In some embodiments, the various types of devices may include gas devices, inspection engineering-related devices, or the like. The gas device may include a pipeline network device, such as a pipeline, a gate station, etc. The inspection engineering-related devices may include an alarm device. In some embodiments, the smart gas object platform may also be provided with a smart gas pipeline network device object sub-platform and a smart gas pipeline network inspection engineering object sub-platform, wherein the smart gas pipeline network device object sub-platform may be configured as various devices including gas devices, or the like, and the smart gas pipeline network inspection engineering object sub-platform may be configured as various devices including inspection engineering-related devices, or the like. In some embodiments, the smart gas pipeline network device object sub-platform may correspond to the smart gas pipeline network device sensor network sub-platform, and upload relevant information of the pipeline network device to the smart gas pipeline network device sensor network sub-platform. In some embodiments, the smart gas pipeline network inspection engineering object sub-platform may correspond to the smart gas pipeline network inspection engineering sensor network sub-platform, and receive the inspection reminder instruction issued by the smart gas pipeline network inspection engineering sensor network sub-platform or feed inspection related information (such as inspection problems) back. In some embodiments, the smart gas object platform may receive the instruction of obtaining the relevant data of the gas pipeline network inspection management issued by the sensor network sub-platform, and upload the relevant data of the gas pipeline network inspection management to the corresponding sensor network sub-platform.

It should be noted that the smart gas user platform in this embodiment may be a desktop computer, a tablet computer, a notebook computer, a mobile phone, or other electronic devices capable of realizing data processing and data communication, which is not limited here. It should be understood that the data processing process mentioned in this embodiment may be processed by a processor of a server. The data stored in the server may be stored in a storage device of the server, such as a hard disk and other memory. In a specific application, the smart gas sensor network platform may use multiple sets of gateway servers or multiple sets of intelligent routers, which are not limited here. It should be understood that the data processing process mentioned in the embodiment of the present disclosure may be processed by a processor of a gateway server. The data stored in the gateway server may be stored in a storage device of the gateway server, such as a hard disk and a solid state drive memory.

In some embodiments of the present disclosure, the method for pipeline network inspection zone generation based on smart gas is implemented through the Internet of Things functional architecture of five platforms, which may form a closed loop of smart gas pipeline network inspection management information flow among pipeline network devices, pipeline network inspection personnel, gas operators, and gas users, realize the informatization and intelligence of pipeline network inspection management, and ensure the best management effect.

It should be noted that the above descriptions of the Internet of Things system and its components are intended to be convenient, and the present disclosure cannot be limited to the scope of the embodiments. It may be understood that for those skilled in the art, after understanding the principle of the system, it is possible to arbitrarily combine the various components, or form a subsystem to connect to other components without departing from the principle. For example, the smart gas service platform and the smart gas pipeline network safety management platform may be integrated into a component. As another example, each component may share a storage device, and each component may also have its own storage device. Those variations and modifications may be within the protection scope of the present disclosure.

Figure 2:
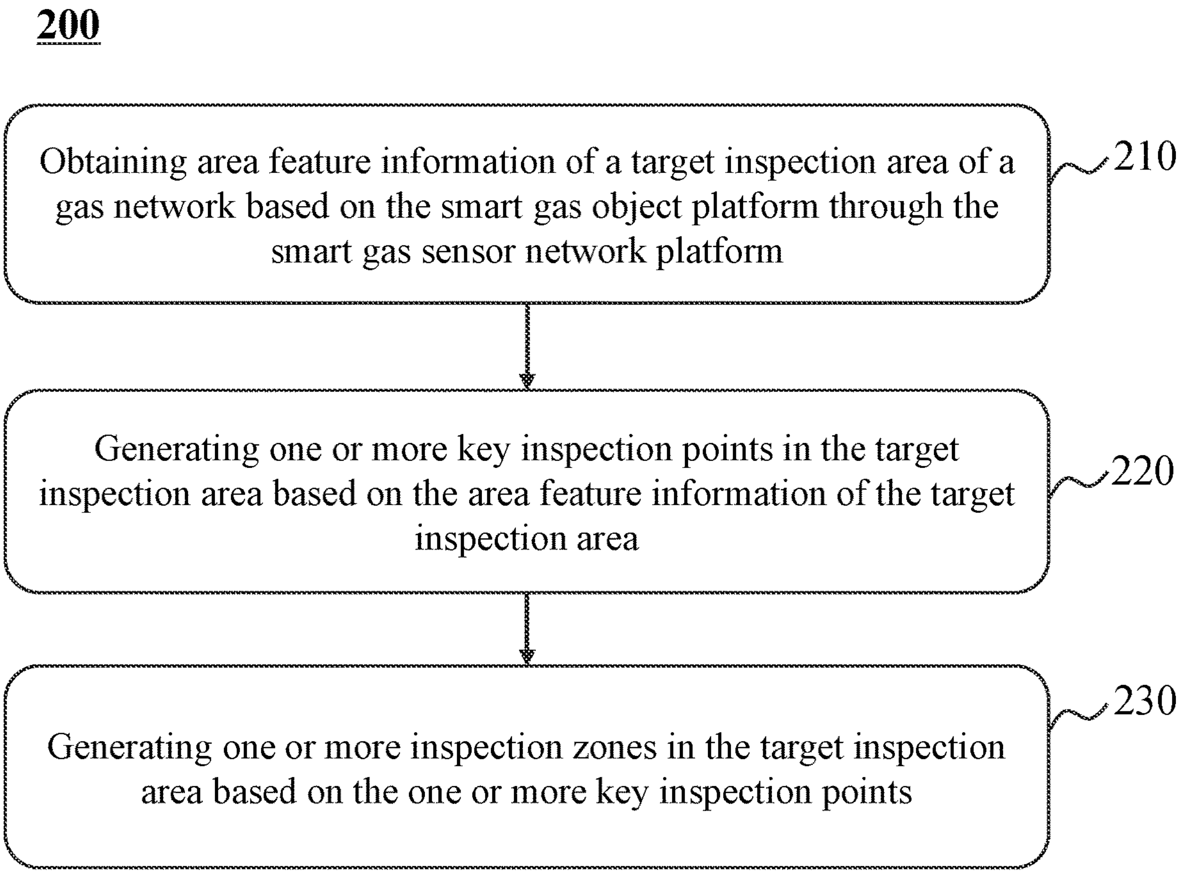
FIG. 2 is an exemplary flowchart illustrating a method for pipeline network inspection zone generation based on smart gas according to some embodiments of the present disclosure.

FIG. 2 is an exemplary flowchart illustrating a method for pipeline network inspection zone generation based on smart gas according to some embodiments of the present disclosure. Process 200 may be executed by the smart gas pipeline network safety management platform. As shown in FIG. 2, process 200 includes steps 210-230.

Step 210, obtaining area feature information of a target inspection area of a gas network based on the smart gas object platform through the smart gas sensor network platform.

The target inspection area refers to an area where gas pipeline network inspection is required. For example, the target inspection area may be a certain city, a certain street in a certain city, or the like. The area feature information refers to feature information that may reflect an inspection situation of a gas pipeline network device (such as pipelines) in the target inspection area. In some embodiments, the area feature information may include a plurality of times of recorded historical inspection data in the target inspection area. The historical inspection data may include whether operation data of the gas pipeline network device (such as pipelines) in the target inspection area of each inspection is normal, inspection problems, accident information, inspection execution situation, etc. The inspection problems refer to problems of the gas pipeline network device found in the inspection process. The accident information refers to related information corresponding to the accidental loss or disaster of the gas pipeline network device in the target inspection area, such as a cause, a treatment manner, and a treatment result. The inspection execution situation refers to a completion situation of a specified count of inspections.

In some embodiments, the target inspection area may include one or more inspection units.

In some embodiments, the target inspection area may be entered into the smart gas user platform by a supervisory user, and sent to the smart gas pipeline network safety management platform through the smart gas service platform. In some embodiments, the smart gas sensor network platform may receive the area feature information of the target inspection area uploaded by the smart gas object platform. The smart gas data center in the smart gas pipeline network safety management platform may receive the area feature information of the target inspection area uploaded by the smart gas sensor network platform.

Step 220, generating one or more key inspection points in the target inspection area based on the area feature information of the target inspection area.

Figure 5:
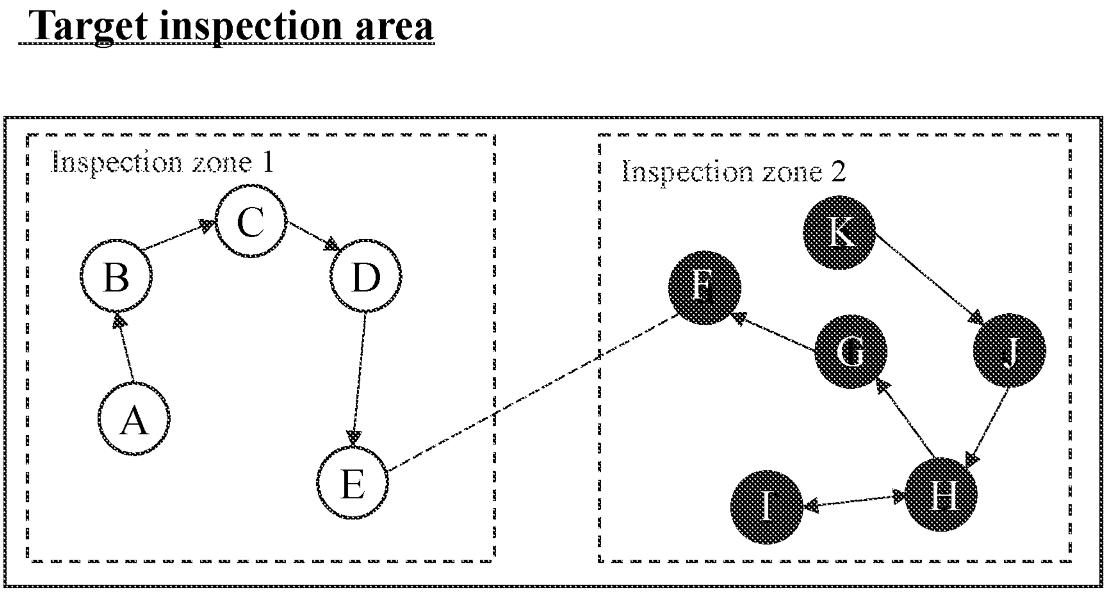
FIG. 5 is a schematic diagram illustrating an exemplary process for determining an inspection route redundancy according to some embodiments of the present disclosure.

The key inspection points refer to important inspection units in the target area. In some embodiments, the key inspection points may be pipelines, pipeline junctions, or pressure regulating stations within the target inspection area. For example, as shown in FIG. 5, the key inspection points may be any pipeline in inspection zone 1 (such as edge AB, edge BC, etc.) or any pipeline in inspection zone 2 (such as edge KJ, edge BC, edge JH, etc.). As another example, the key inspection points may be the pipeline junctions or pressure regulating stations in inspection zone 1 (such as node A, node B, node C, etc.) or the pipeline junctions or pressure regulating stations in inspection zone 2 (such as node K, node J, node H, etc.).

In some embodiments, the key inspection points may be determined by those skilled in the art according to historical inspection data. For example, if the historical inspection data of edge AB in FIG. 5 shows that the count of inspection abnormalities exceeds a first preset threshold, then edge AB may be determined as a key inspection point. The first preset threshold may be set by those skilled in the art according to experience.

In some embodiments, the smart gas pipeline network safety management platform may generate an accident rate and an inspection hit rate of each inspection unit in the target inspection area based on the target inspection area, and generate the one or more key inspection points in the target inspection area based on the accident rate and the inspection hit rate of the each inspection unit. For more specific descriptions of how to determine one or more key inspection points in the target inspection area, please refer to FIG. 3 and its descriptions below.

Step 230, generating one or more inspection zones in the target inspection area based on the one or more key inspection points.

The inspection zones refer to part of or all the inspection areas divided from the target inspection area. For example, the inspection zone may be the inspection zone 1 or the inspection zone 2 in FIG. 5.

In some embodiments, the smart gas pipeline network safety management platform may determine the one or more inspection zones in the target inspection area according to a preset count of key inspection points that each inspection zone needs to contain. The preset count of key inspection points that the each inspection area needs to contain may be set by those skilled in the art based on experience.

In some embodiments, the smart gas pipeline network safety management platform may generate one or more candidate division schemes based on the one or more key inspection points. Then, the smart gas pipeline network safety management platform may generate a population to be optimized including a first preset count of individuals based on the one or more candidate division schemes, wherein each of the individuals corresponds to one of the candidate division schemes. Then, the smart gas pipeline network safety management platform may generate a target division scheme by performing a plurality of rounds of iterative optimization on the one or more candidate division schemes until a preset condition is satisfied. Finally, the smart gas pipeline network safety management platform may determine the one or more inspection zones in the target inspection area based on the target division scheme. For a more specific description of how to determine the one or more inspection zones in the target inspection area based on the one or more key inspection points, please refer to FIG. 4 and its description below.

In some embodiments of the present disclosure, the smart gas pipeline network safety management platform may rationally allocate the target inspection area into one or more inspection zones based on the area feature information of the target inspection area, which can clarify a duty scope of the inspection personnel to improve the efficiency of gas pipeline network inspections.

Figure 3:
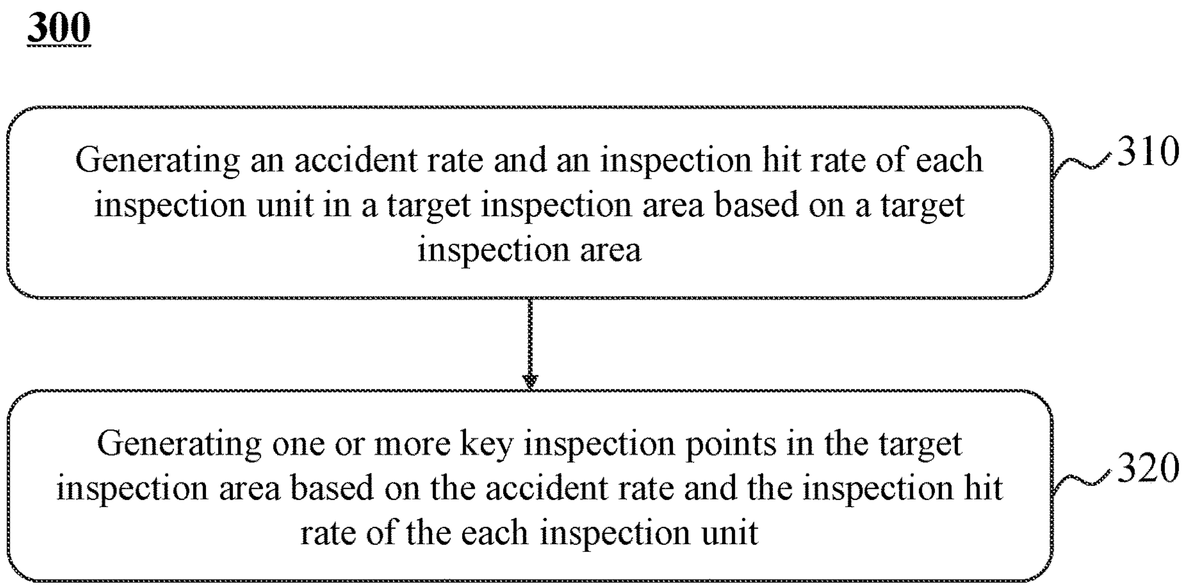
FIG. 3 is a flowchart illustrating an exemplary process for generating one or more key inspection points in a target inspection area according to some embodiments of the present disclosure.

FIG. 3 is a flowchart illustrating an exemplary process for generating one or more key inspection points in a target inspection area according to some embodiments of the present disclosure. In some embodiments, process 300 may be executed by a processor of the smart gas pipeline network safety management platform. As shown in FIG. 3, the process 300 may include steps 310-320.

Step 310, generating an accident rate and an inspection hit rate of each inspection unit in a target inspection area based on a target inspection area.

The inspection unit refers to a smallest inspection unit in the target inspection area. For example, the inspection unit may include pipelines, pipeline junctions, or pressure regulating stations. In some embodiments, the target inspection area may include one or more inspection units.

The accident rate is a probability of an accident occurring. In some embodiments, the accident rate may be a result of dividing a count of days in which accidents occurred in the inspection unit in historical data within a certain historical time period divided by a total count of days.

The inspection hit rate may be a result of dividing a count of inspections that found problems or failures during the inspection of the inspection unit in the historical data within a certain historical time period divided by a total count of inspections.

In some embodiments, the area feature information of the target inspection area uploaded by the smart gas object platform may be obtained through the smart gas sensor network platform, and then uploaded to the smart gas data center. The smart gas pipeline network safety management platform may calculate and generate the accident rate and inspection hit rate of the each inspection unit in the target inspection area according to the uploaded area feature information. The area feature information may include the count of days when accidents occurred in the each inspection unit in the inspection area, the total count of days of safe operation, the count of inspections that found problems or failures found during the inspection of the inspection unit, the total count of inspections, etc.

Step 320, generating the one or more key inspection points in the target inspection area based on the accident rate and the inspection hit rate of the each inspection unit.

In some embodiments, those skilled in the art may set the one or more key inspection points in the target inspection area according to experience. For example, those skilled in the art may determine an inspection unit with a high accident rate as the one or more key inspection points in the target inspection area.

In some embodiments, the smart gas pipeline network safety management platform may calculate a first criticality and a second criticality of the each inspection unit based on the accident rate and the inspection hit rate of the each inspection unit, and determine the one or more key inspection points in the target inspection area based on the first criticality and the second criticality of the each inspection unit and a count of preset key inspection points.

In some embodiments, the smart gas pipeline network safety management platform may divide all inspection units in the target inspection area into one or more layers based on the accident rate and the inspection hit rate of the each inspection unit through a dominance relationship determined according to a sorting algorithm. Each layer may correspond to a plurality of inspection units. In some embodiments, the first criticality may be a number of a layer where the inspection unit is located. For example, if inspection unit A is located on the third layer, the first criticality of inspection unit A is 3. In some embodiments, the first criticality of one or more inspection units located on the same layer is the same.

In some embodiments, all the inspection units may be sorted through the following sorting algorithm.

In some embodiments, each inspection unit p in the target inspection area may include two inspection parameters $n_p$ and $s_p$. $n_p$ is a count of inspection units dominating inspection unit p in the target inspection area, $s_p$ is a set of inspection units dominated by the inspection unit p in the target inspection area, and the inspection units dominating the inspection unit p refer to inspection units with higher accident rates and inspection hit rates than the inspection unit p. $n_p$ and $s_p$ of each inspection unit are obtained by traversing the whole target inspection area.

Step 1: saving inspection units with $n_p$ being 0 in the target inspection area in a current set F1;

Step 2: for inspection unit i in the current set F1, a set of inspection units dominated by it is Si, obtaining $n_p$ and $s_p$ of each inspection unit by traversing each inspection unit p in the Si, and if $n_p$ is 0, saving the inspection unit i in a set H; and Step 3: recording the inspection units obtained in the F1 as the inspection units of the first layer, taking H as a current set, and repeating the above steps until the inspection units in the entire target area are layered.

The second criticality may be a value obtained by calculating a weighted sum of the accident rate and the inspection hit rate of the each inspection unit. In some embodiments, the weights of the accident rate and the inspection hit rate may be preset values. In some embodiments, the smart gas pipeline network safety management platform may judge the criticalities of the accident rate and the inspection hit rate according to the area feature information of the target inspection area, and then set the weights of the accident rate and the inspection hit rate based on the criticalities. For example, when the smart gas pipeline network safety management platform judges that the accident rate is more critical based on the area feature information of the target inspection area, the weight of the accident rate may be set higher than the weight of the inspection hit rate.

The preset count of key inspection points refers to a count of preset key inspection points in the target inspection area.

In some embodiments, those skilled in the art may set the preset count of key inspection points according to actual conditions.

In some embodiments, the preset count of key inspection points may be related to a historical inspection route redundancy. The historical inspection route redundancy may be an average of an inspection route redundancy of each inspection zone divided by a historical division scheme. In some embodiments, the greater the average value of the inspection route redundancy of the each inspection zone divided by the historical division scheme, the greater the count of the preset key inspection points.

The inspection route redundancy refers to a repetition degree of inspection routes.

In some embodiments, the inspection route redundancy ($L_1 \times K_1 + L_2 \times K_2$) may be determined through a count of repeated edges and a total length of the repeated edges determined by drawing with one stroke based on the nodes of each inspection zone. $K_1$ is a count of repeated edges in the inspection route, $K_2$ is a total length of repeated edges in the inspection route, and $L_1$ and $L_2$ are preset values. For more details about this part, please refer to FIG. 5 and its descriptions below.

When the historical inspection route redundancy exceeds a certain threshold, the preset count of key inspection points may be increased. Therefore, more inspection zones may be divided, the complexity of each inspection zone is correspondingly reduced, and the inspection route redundancy corresponding to an inspection zone generated later is reduced, thereby improving the efficiency of inspection personnel in different zones.

In some embodiments, the smart gas pipeline network safety management platform may set the count (for example, N) of preset key inspection points. In some embodiments, the smart gas pipeline network safety management platform may select inspection units as key inspection points in an ascending order for all inspection units in the target inspection area based on the first criticality. When a count of inspection units corresponding to a certain first criticality is greater than a count of remaining optional key inspection points (that is, inspection units of the current first criticality may not all become key inspection points, otherwise, the count of the key inspection points may exceed N), the smart gas pipeline network safety management platform may compare the second criticality of all inspection units of the current first criticality. Based on the second criticality, the inspection units are selected in order from large to small and added to the key inspection points until the count of the key inspection points reaches N.

There are 10 inspection units on the third layer, and the first criticality is 3 . . . First, selecting may be performed from small to large according to the first criticality, and all 5 inspection units on the first layer may be selected, which is not enough to preset the count of the key inspection points. All 7 inspection units on the second layer may be select continuously, and there are still 3 key inspection points missing. Then it is necessary to select 3 inspection units from the 10 inspection units on the third layer. The second criticalities of the 10 inspection units on the third layer may be compared, and three inspection units with a largest second criticality may be used as the key inspection points, and a total of 15 key inspection points may be selected.

In some embodiments of the present disclosure, based on the first criticality and second criticality of the each inspection unit and the count of the preset key inspection points, the inspection unit that is more prone to accidents may be determined as the one or more key inspection points in the target inspection area.

It should be noted that the above descriptions about processes 200 and 300 are only for illustration and description, and do not limit the scope of application of the present disclosure. For those skilled in the art, various modifications and changes may be made to the processes 200 and 300 under the guidance of the present disclosure. However, these modifications and changes are still within the scope of the present disclosure.

Figure 4:
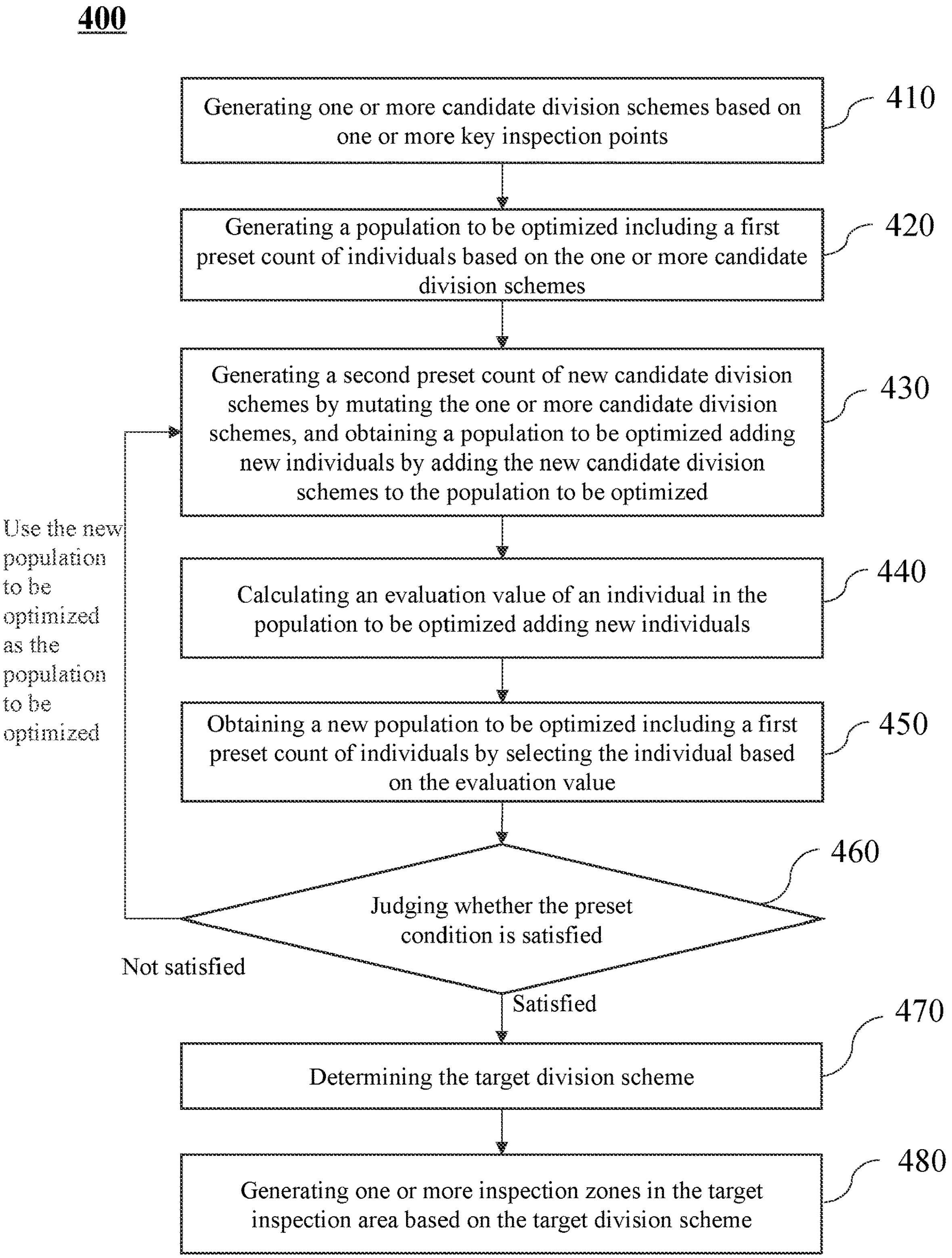
FIG. 4 is a flowchart illustrating an exemplary process for generating one or more inspection zones in the target inspection area according to some embodiments of the present disclosure.

FIG. 4 is a flowchart illustrating an exemplary process for generating one or more inspection zones in the target inspection area according to some embodiments of the present disclosure. In some embodiments, process 400 may be executed by a processor of the smart gas pipeline network safety management platform. As shown in FIG. 4, the process 400 may include steps 410-480.

Step 410, generating one or more candidate division schemes based on one or more key inspection points.

The candidate division schemes refer to candidate schemes for dividing the target inspection area.

In some embodiments, those skilled in the art may randomly divide the target inspection area into multiple inspection zones with a tendency to generate a candidate division scheme in a way that the count of inspection units and the count of key inspection points contained in each inspection zone is sufficiently balanced as far as possible.

Step 420, generating a population to be optimized including a first preset count of individuals based on the one or more candidate division schemes.

In some embodiments, the population to be optimized may include a plurality of individuals, and each individual may correspond to a candidate division scheme.

The first preset count refers to a count of candidate division schemes preset in the population to be optimized.

In some embodiments, the first preset count may be set by those skilled in the art based on experience.

In some embodiments, the processor may perform a plurality of rounds of iterative optimization on the one or more candidate division schemes until a preset condition is satisfied, and then determine the target division scheme. One of the plurality of rounds of iterative optimization may include operations of steps 430-450.

Step 430, generating a second preset count of new candidate division schemes by mutating the one or more candidate division schemes, and obtaining a population to be optimized adding new individuals by adding the new candidate division schemes to the population to be optimized.

The mutating refers to a process of reclassifying the one or more candidate division schemes based on a preset rule to generate one or more new candidate division schemes. The preset rule may be any feasible rule.

Figure 6:
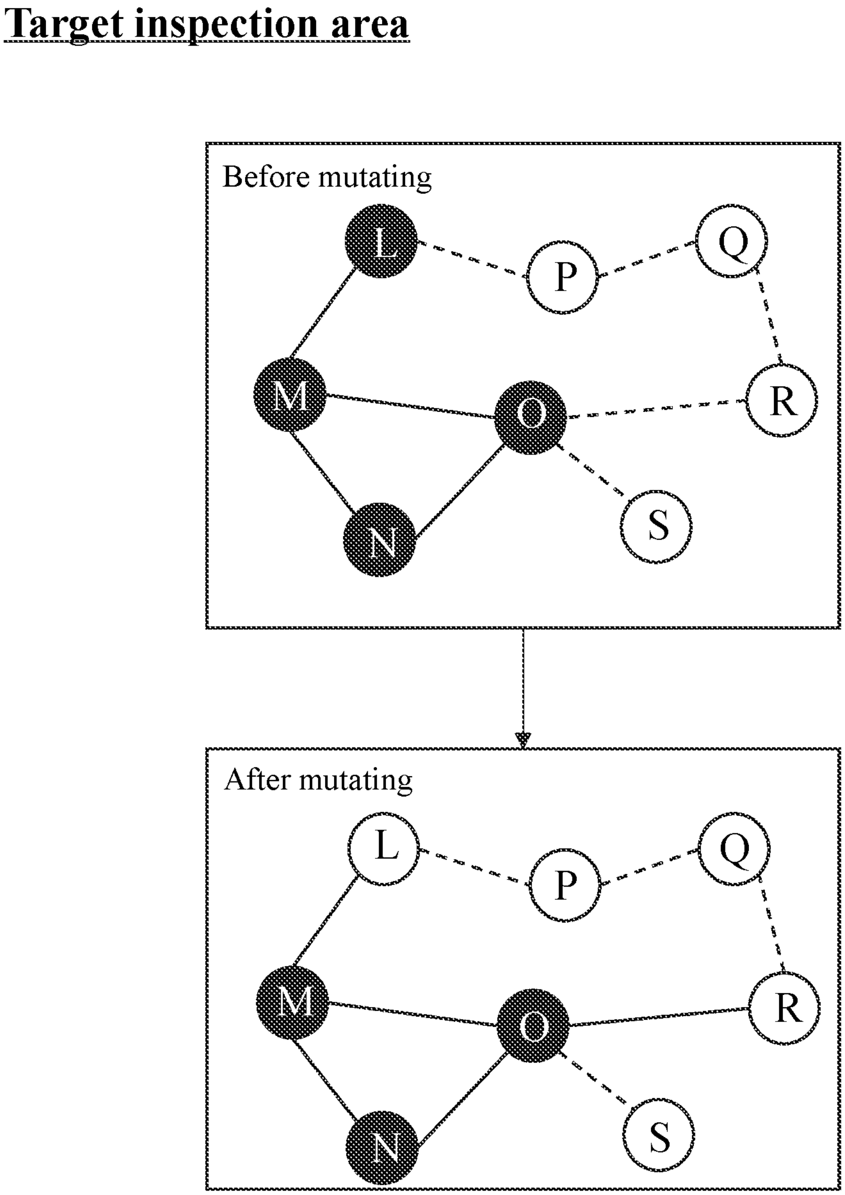
FIG. 6 is a schematic diagram illustrating an exemplary process for re-dividing adjacent inspection zones according to some embodiments of the present disclosure.

In some embodiments, the mutating may include re-dividing adjacent inspection zones. For example, as shown in FIG. 6, the target inspection area may include an inspection zone X and an inspection zone Y. Before the mutating, inspection zone X includes node L, node M, node N, node O, edge ML, edge MN, edge NO, and edge MO. The inspection zone Y includes node P, node Q, node R, node S, edge PL, edge PQ, edge QR, edge RO, and edge SO. After the mutating, inspection zone X includes node M, node N, node O, edge ML, edge MN, edge NO, edge MO, and edge OR. The inspection zone Y includes node L, node P, node Q, node R, node S, edge PL, edge Q, edge QR, and edge SO. The nodes represent pipeline junction positions, pressure regulating stations, etc., and the edges represent pipelines.

In some embodiments, the smart gas pipeline network safety management platform may determine a mutating probability of a node or an edge at a junction of the adjacent inspection zones. The mutating probability may be related to a first criticality and a second criticality of an inspection unit contained in the adjacent inspection zones. Furthermore, the smart gas pipeline network safety management platform may re-divide the adjacent inspection zones based on the mutating probability.

The node at the junction refer to a node whose directly connected edges are not completely in a same inspection zone. For example, as shown in FIG. 6, the node at the junction may be the nodes L and O before mutating. The edges at the junction refer to an edge whose directly connected nodes are not completely in a same inspection zone. For example, as shown in FIG. 6, the edge at the junction may be edges LP and OR before mutating. The mutating probability refers to a probability that the inspection zone to which the node at the junction and/or the edge at the junction belongs changes.

In some embodiments, the mutating probability of the node at the junction may be determined based on a difference determined by subtracting an average of second criticalities from an average of first criticalities of all inspection units in each inspection zone where the node at the junction is located and its adjacent inspection zones (for example, $a=m_1-m_2$, where $m_1$ is the average of the first criticality, $m_2$ is the average of the second criticality, and a is the difference). In some embodiments, the inspection zones adjacent to the node at the junction may be one or more inspection zones. In some embodiments, when the difference between the inspection zones is larger, the node at the junction tend to be in the inspection zone. In some embodiments, when the difference between the inspection zones is smaller, the node at the junction tend not to be in the inspection zone.

For example, as shown in FIG. 6, the black circle represents the node located in inspection zone X in the candidate scheme, the white circle represents the node located in inspection zone Y, and the remaining inspection zones in the candidate scheme are not drawn. Node L is the node at the junction of inspection zone X and inspection zone Y. If the difference in inspection zone X is smaller than the difference in inspection zone Y, node L tends to mutate to inspection zone Y, that is, the mutating probability is higher. If the difference in inspection zone X is greater than the difference in inspection zone Y, node L tends not to mutate, and the mutating probability is smaller.

In some embodiments, the inspection zones may be re-divided based on the mutating probability of the node at the junction using any random algorithm. For example, as shown in FIG. 6, before the mutating, node L at the junction is located in the inspection zone X. The edge OR at the junction is located in inspection zone Y. If the mutating probability of node L at the junction is 95%, then the non-mutating probability of node L at the junction is 5%. When judging whether the node L at the junction is mutated, any random algorithm (the random algorithm may ensure that numbers are evenly generated) may be used to randomly generate a number between 0-1, if the number falls in the interval [0,0.95], the node L at the junction is mutated, and if the number falls in the interval (0.95,1], the node L at the junction does not mutate. Exemplarily, if the random number generated by node L at the junction is 0.6, which is in the interval [0,0.95], the node L is mutated to the inspection zone Y. Similarly, the edge OR at the junction is located in inspection zone Y before the mutating, and it is mutated to inspection zone X due to the mutating. Since the node and edge at the junction of the two inspection zones X and Y have changed, the re-divided inspection zone X and inspection zone Y are obtained.

In some embodiments, after one or more nodes and/or edges at the junction in the inspection zones are mutated, the re-divided inspection zone A and re-divided inspection zone B are obtained.

In some embodiments, when there are a plurality of maximum differences in the inspection zone where the node at the junction is located and its adjacent inspection zones, the node at the junction may randomly mutate among the inspection zones with the plurality of maximum differences.

In some embodiments of the present disclosure, based on the first criticality and the second criticality, the inspection zones are re-divided to ensure a balanced division of each inspection zone.

In some embodiments, the first preset count and the second preset count may be the same or different.

The new candidate scheme refers to a new candidate division scheme generated by mutating the one or more candidate division schemes.

The population to be optimized adding new individuals refers to a population to be optimized adding new candidate division schemes.

Step 440, calculating an evaluation value of an individual in the population to be optimized adding new individuals.

The evaluation value refers to a redundancy of the individual.

In some embodiments, the evaluation value is generated based on an average of an inspection route redundancy of each inspection zone divided by a corresponding candidate division scheme.

Step 450, obtaining a new population to be optimized including a first preset count of individuals by selecting the individual based on the evaluation value.

In some embodiments, the smart gas pipeline network safety management platform may arrange the evaluation values of all individuals in an ascending order, and select the first preset count of individuals from front to back.

In some embodiments of the present disclosure, by selecting a new population to be optimized through the evaluation value, individuals with a lower average of inspection route redundancy in the each inspection zone divided by the corresponding candidate division scheme can be regarded as the new population to be optimized, thereby improving the efficiency of inspection.

Step 460, judging whether the preset condition is satisfied.

In some embodiments, the preset condition may be one or more of the evaluation value meeting a preset requirement, the evaluation value converging, or completing specified times (for example, 300 times, 500 times, 800 times, etc.) of iterations. The evaluation value meeting the preset requirement means that the iteration is stopped when the evaluation value of an individual is less than a second preset threshold, and the candidate division scheme corresponding to the individual is directly used as the final division scheme. The evaluation value converging means that starting from a certain round of iterations and in consecutive rounds of iterations (for example, 10 rounds of iterations, 20 rounds of iterations, etc.), the evaluation value is considered to be convergent when the variance of the smallest evaluation value in the plurality of candidate division schemes of each round of iteration is less than the third preset threshold.

In some embodiments, in response to the preset condition being satisfied, the processor may execute step 470 to determine the target division scheme. In some embodiments, in response to the preset condition not being satisfied, the processor may use the new population to be optimized as the population to be optimized and continue to execute steps 430-460.

Step 470, determining the target division scheme.

The target division scheme refers to a candidate division scheme finally selected in the population to be optimized.

In some embodiments, when there are one or more candidate division schemes that meet the preset condition in the population to be optimized, the smart gas pipeline network safety management platform may select an optimal candidate division scheme as the target division scheme from the one or more candidate division schemes. In some embodiments, the optimal candidate division scheme may be determined manually. In some embodiments, the smart gas pipeline network safety management platform may output a candidate division schemes with a largest evaluation value among the one or more candidate division schemes as the optimal candidate division scheme.

Step 480, generating the one or more inspection zones in the target inspection area based on the target division scheme.

In some embodiments, the smart gas pipeline network safety management platform may determine the one or more inspection zones in the target inspection area based on a division manner of the inspection zone in the target division scheme.

In some embodiments of the present disclosure, the population to be optimized is optimized through the plurality of rounds of iterations to determine a better candidate division scheme as the target division scheme, so as to determine the one or more inspection zones in the target inspection area. The inspection personnel in different zones are realized to be responsible for the inspection work in their zones, and the efficiency of inspection is improved.

FIG. 5 is a schematic diagram illustrating an exemplary process for determining an inspection route redundancy according to some embodiments of the present disclosure.

The target inspection area may be divided into inspection zone 1 and inspection zone 2. Inspection zone 1 includes a plurality of nodes (for example, node A, node B, node C, node D, and node E) and a plurality of edges (for example, edge AB, edge BC, edge CD, edge DE), an arrow between any two nodes represents the direction of the inspection route. Inspection zone 2 includes a plurality of nodes (for example, node F, node G, node H, node I, node J, and node K) and a plurality of edges (for example, edge HI, edge HG, edge GF, edge JH, edge KJ), an arrow between any two nodes represents the direction of the inspection route. The nodes represent pipeline junction positions, pressure regulating stations, etc., and the edges represent pipelines.

In some embodiments, an inspection route redundancy of each inspection zone may be determined based on a one-stroke algorithm.

The one-stroke algorithm refers to an algorithm for judging whether the plurality of nodes in the inspection zone are capable of being drawn in one stroke without repeating line segments based on a singular point number N in the inspection zone.

The singular point number N refers to a count of singular points in the inspection zone. The singular point is a node that has an odd count of connected edges. For example, in inspection zone 1, there is one edge connected to node A, and node A is a singular point in inspection zone 1. As another example, in inspection zone 2, there are three edges connected to node H, and node H is a singular point in inspection zone 2. In addition, node E, node I, node F, and node K are respectively connected with one edge. That is, node I, node F, and node K are also singular points of inspection area 2, and node E is also a singular point of inspection zone 1. Since inspection zone 1 and inspection zone 2 are not interconnected, node E and node F may be considered to have one connected edge. Therefore, the count of singular points in inspection zone 1 is 2, and the count of singular points in inspection zone 2 is 4.

In some embodiments, in response to the singular point number N in the one-stroke algorithm being 0 or 2, the smart gas pipeline network inspection management sub-platform may determine that the inspection zone may be drawn in one stroke without repeating line segments, then the inspection route redundancy of the inspection zone is 0. For example, if the singular point number N in inspection zone 1 is 2, the inspection route redundancy in inspection zone 1 is 0.

In some embodiments, in response to the singular point number N in the one-stroke algorithm being greater than 2, the smart gas pipeline network inspection management sub-platform may determine that the inspection zone may not be drawn in one stroke without repeating line segments. Then, the inspection route redundancy in the inspection zone may be determined according to a situation of adding edges (for example, a count and length of added edges, etc.).

In some embodiments, the smart gas pipeline network inspection management sub-platform may select two singular points as a starting point and an ending point, respectively, according to specific requirements. The smart gas pipeline network inspection management sub-platform may pair the other N−2 singular points in pairs, and the paired singular points are connected again with the original edges to realize adding an edge. The connected edges are the line segments that need to be passed repeatedly.

In some embodiments, the sum of the lengths of redundant line segments in the inspection route in the each inspection zone is the redundancy corresponding to the candidate division scheme. For example, the redundancy in inspection zone 2 is the length of the redundant line segment HI in the inspection route in inspection zone 2.

In some embodiments, when the redundancies in a plurality of inspection zones may not be directly compared, the redundancy L of the inspection route at this time may be $(L_1 \times K_1 + L_2 \times K_2)$. $K_1$ is a count of repeated edges in the inspection route, $K_2$ is a total length of the repeated edges in the inspection route, and $L_1$ and $L_2$ are preset values. Not be directly compared refers to a situation that one of the two inspection zones has a larger count of repeated edges and a smaller total length of repeated edges than the other inspection zone.

The singular point pairing principle may include determining a target inspection route based on features of the edges of the inspection zone or a last inspection time of at least one gas pipeline network. For example, in inspection zone 2, if the distance of an existing gas pipeline segment between node F and node H is 30 m, and the distance of the gas pipeline segment between node H and node I is 25 m, and there is no gas pipeline segment between node F and node K and between node F and node I for connection. Therefore, node H and node I are closer and may be chosen to connect, the result of pairing connection is as shown in the processed inspection zone 2, and the double-direction arrow represents the repeated route.

In some embodiments of the present disclosure, the one-stroke algorithm can be used to quickly and accurately judge the redundancy of the inspection zone, and then the population to be optimized is optimized through a plurality of rounds of iterations, which can determine a better candidate division scheme as the target division scheme and improve the inspection efficiency.

The present disclosure includes a non-transitory computer-readable storage medium, which stores computer instructions, and when the computer instructions are executed by a processor, a method for pipeline network inspection zone generation based on smart gas is implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Finally, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for inspection zone generation of smart gas, implemented based on an Internet of Things system for the inspection zone generation of the smart gas, wherein the Internet of Things system includes a smart gas pipeline network safety management platform, a smart gas sensor network platform, and a smart gas object platform that interact in turn, wherein the smart gas sensor network platform is configured as a communication network and gateway to realize network management, protocol management, instruction management, and data analysis, and the method is executed by a processor in the smart gas pipeline network safety management platform, the method comprising:

obtaining area feature information of a target inspection area of a gas network based on the smart gas object platform through a processor in the smart gas sensor network platform, wherein the target inspection area is determined by a user input into a smart gas user platform;

generating one or more key inspection points in the target inspection area based on the area feature information of the target inspection area by the processor in the smart gas pipeline network safety management platform;

generating one or more inspection zones in the target inspection area based on the one or more key inspection points by the processor of the smart gas pipeline network safety management platform; and allocating inspection personnel to perform inspection in the one or more inspection zones; wherein the target inspection area includes one or more inspection units, and generating the one or more key inspection points in the target inspection area based on the area feature information of the target inspection area includes:

generating, by the processor in the smart gas pipeline network safety management platform, an accident rate and an inspection hit rate of each inspection unit in the target inspection area based on the target inspection area, wherein the accident rate and the inspection hit rate are related to a weight set by the smart gas pipeline network safety management platform based on the area feature information of the target inspection area; and generating, by the processor of the smart gas pipeline network safety management platform, the one or more key inspection points in the target inspection area based on the accident rate and the inspection hit rate of each inspection unit.

2. The method according to claim 1, wherein generating the one or more key inspection points in the target inspection area based on the accident rate and the inspection hit rate of each inspection unit includes:

calculating a first criticality and a second criticality of each inspection unit based on the accident rate and the inspection hit rate of each inspection unit; and generating the one or more key inspection points in the target inspection area based on the first criticality and the second criticality of each inspection unit and a count of preset key inspection points.

3. The method according to claim 2, wherein the count of the preset key inspection points is related to a historical inspection route redundancy, and the historical inspection route redundancy is an average of an inspection route redundancy of each inspection zone divided by a historical division scheme.

4. The method according to claim 1, wherein generating the one or more inspection zones in the target inspection area based on the one or more key inspection points includes:

generating one or more candidate division schemes based on the one or more key inspection points;

generating a population to be optimized including a first preset count of individuals based on the one or more candidate division schemes, wherein each of the individuals corresponds to one of the one or more candidate division schemes;

generating a target division scheme by performing a plurality of rounds of iterative optimization on the one or more candidate division schemes until a preset condition is satisfied; and generating the one or more inspection zones in the target inspection area based on the target division scheme.

5. The method according to claim 4, wherein each of the plurality of rounds of iterative optimization includes:

generating a second preset count of new candidate division schemes by mutating the one or more candidate division schemes;

obtaining a second population to be optimized adding new individuals by adding the new candidate division schemes to the population to be optimized, and wherein the mutating includes: re-dividing adjacent inspection zones.

6. The method according to claim 5, wherein each of the plurality of rounds of iterative optimization further includes:

calculating an evaluation value of an individual in the population to be optimized adding new individuals; and obtaining a new population to be optimized including a first preset count of individuals by selecting the individual based on the evaluation value, and the evaluation value is generated based on an average of an inspection route redundancy of each inspection zone divided by a candidate division scheme corresponding to the evaluation value.

7. A non-transitory computer-readable storage medium, wherein the non-transitory computer-readable storage medium stores computer instructions, and when the computer instructions are executed by a processor, the method according to claim 1 is implemented.

8. A device for the inspection zone generation of the smart gas, comprising at least one processor and at least one storage, wherein the at least one storage is configured to store computer instructions; and the at least one processor is configured to execute at least part of the computer instructions to implement the method according to claim 1.

9. An Internet of Things (IoT) system for inspection zone generation of smart gas, comprising a smart gas pipeline network safety management platform, a smart gas sensor network platform, and a smart gas object platform that interact in turn, wherein the smart gas sensor network platform is configured as a communication network and gateway to realize network management, protocol management, instruction management, and data analysis, and a processor in the smart gas pipeline network safety management platform is configured to cause the IoT system to:

obtain area feature information of a target inspection area of a gas network based on the smart gas object platform through the smart gas sensor network platform, wherein the target inspection area is determined by a user input a smart gas user platform;

generate one or more key inspection points in the target inspection area based on the area feature information of the target inspection area;

generate one or more inspection zones in the target inspection area based on the one or more key inspection points; and allocate inspection personnel to perform inspection in the one or more inspection zones; wherein the target inspection area includes one or more inspection units, and the processor in the smart gas pipeline network safety management platform is configured to cause the IoT system to:

generate an accident rate and an inspection hit rate of each inspection unit in the target inspection area based on the target inspection area, wherein the accident rate and the inspection hit rate are related to a weight set by the smart gas pipeline network safety management platform based on the area feature information of the target inspection area; and generate the one or more key inspection points in the target inspection area based on the accident rate and the inspection hit rate of each inspection unit.

* * * * *